(12) United States Patent
Powell

(10) Patent No.: US 8,875,733 B2
(45) Date of Patent: Nov. 4, 2014

(54) CHECK VALVE IN BACKFLOW PREVENTION DEVICE

(71) Applicant: Douglas Hunter Powell, Eldorado Hills, CA (US)

(72) Inventor: Douglas Hunter Powell, Eldorado Hills, CA (US)

( * ) Notice: Subject to any disclaimer, the term of this patent is extended or adjusted under 35 U.S.C. 154(b) by 0 days.

(21) Appl. No.: 13/705,016

(22) Filed: Dec. 4, 2012

(65) Prior Publication Data

US 2014/0150904 A1    Jun. 5, 2014

(51) Int. Cl.
*F16K 15/03* (2006.01)
*F16K 15/00* (2006.01)

(52) U.S. Cl.
CPC ...................................... *F16K 15/00* (2013.01)
USPC ............................. 137/512; 137/527; 137/613

(58) Field of Classification Search
CPC .............................. F16K 15/033; F16K 15/035
USPC ........ 137/512, 527, 613, 614.2, 551; 251/303
See application file for complete search history.

(56) References Cited

U.S. PATENT DOCUMENTS

| | | | |
|---|---|---|---|
| 3,013,579 A * | 12/1961 | Gilliam | 137/515.5 |
| 3,283,772 A * | 11/1966 | Ensign | 137/107 |
| 4,893,654 A | 1/1990 | Feuz | |
| 5,046,525 A | 9/1991 | Powell | |
| 5,236,009 A | 8/1993 | Ackroyd | |
| 5,584,315 A | 12/1996 | Powell | |
| 5,711,341 A | 1/1998 | Funderburk et al. | |
| 6,021,805 A * | 2/2000 | Horne et al. | 137/375 |
| 6,343,618 B1 | 2/2002 | Britt et al. | |
| 6,443,181 B1 | 9/2002 | Powell | |
| 6,478,047 B1 | 11/2002 | Powell | |
| 6,502,598 B2 | 1/2003 | Engelmann | |
| 6,546,946 B2 | 4/2003 | Dunmire | |
| 2005/0045847 A1 | 3/2005 | Powell | |

* cited by examiner

*Primary Examiner* — Kevin Lee
*Assistant Examiner* — P. Macade Nichols
(74) *Attorney, Agent, or Firm* — Superior IP, PLLC; Dustin L. Call

(57) ABSTRACT

A check valve module. The check valve module includes an orifice, where the orifice is configured to allow the water flow stream through the check valve module. The check valve module also includes a clapper. The clapper is configured to allow the water flow stream through the orifice when open and prevent the water flow stream through the orifice when in a closed position by mating with the orifice. The check valve module further includes a fulcrum apparatus about which the clapper is allowed to rotate, a rotational constraint apparatus which directs the rotation of the clapper and a lateral constraint apparatus which directs the motion of the fulcrum toward and away from the orifice.

17 Claims, 17 Drawing Sheets

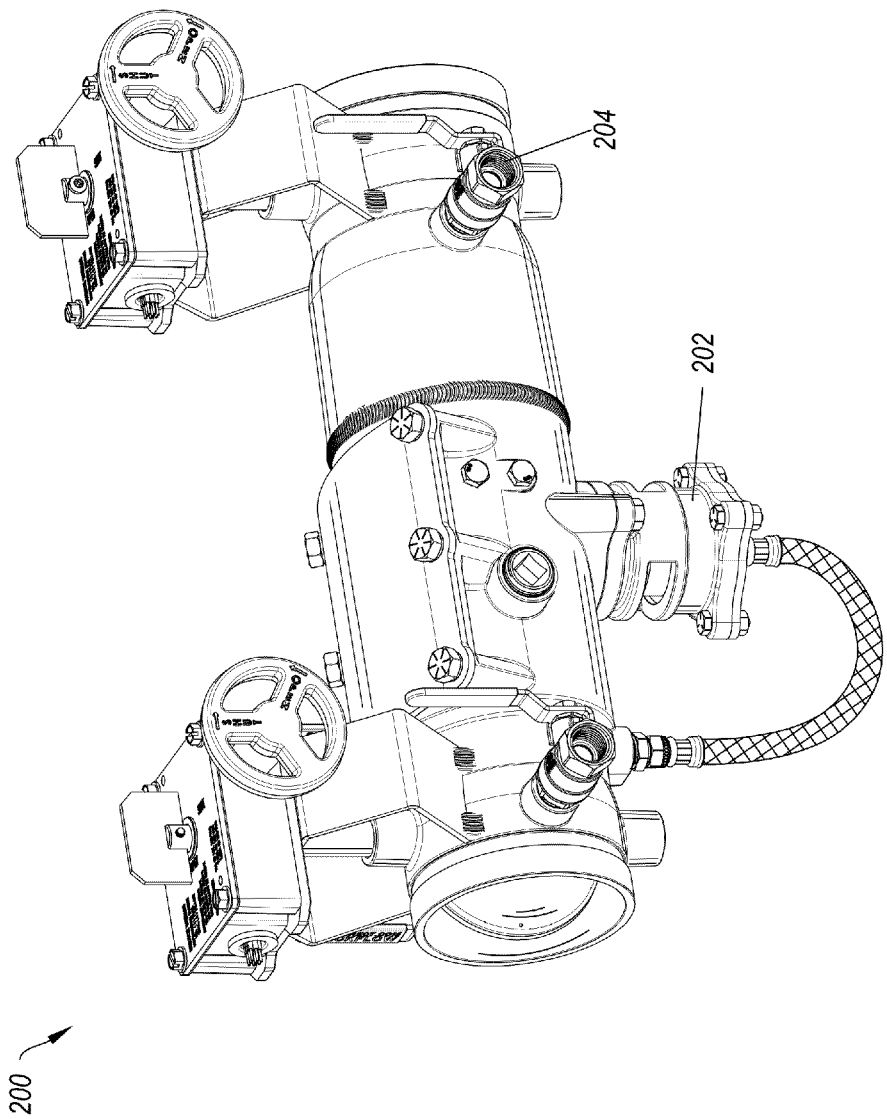

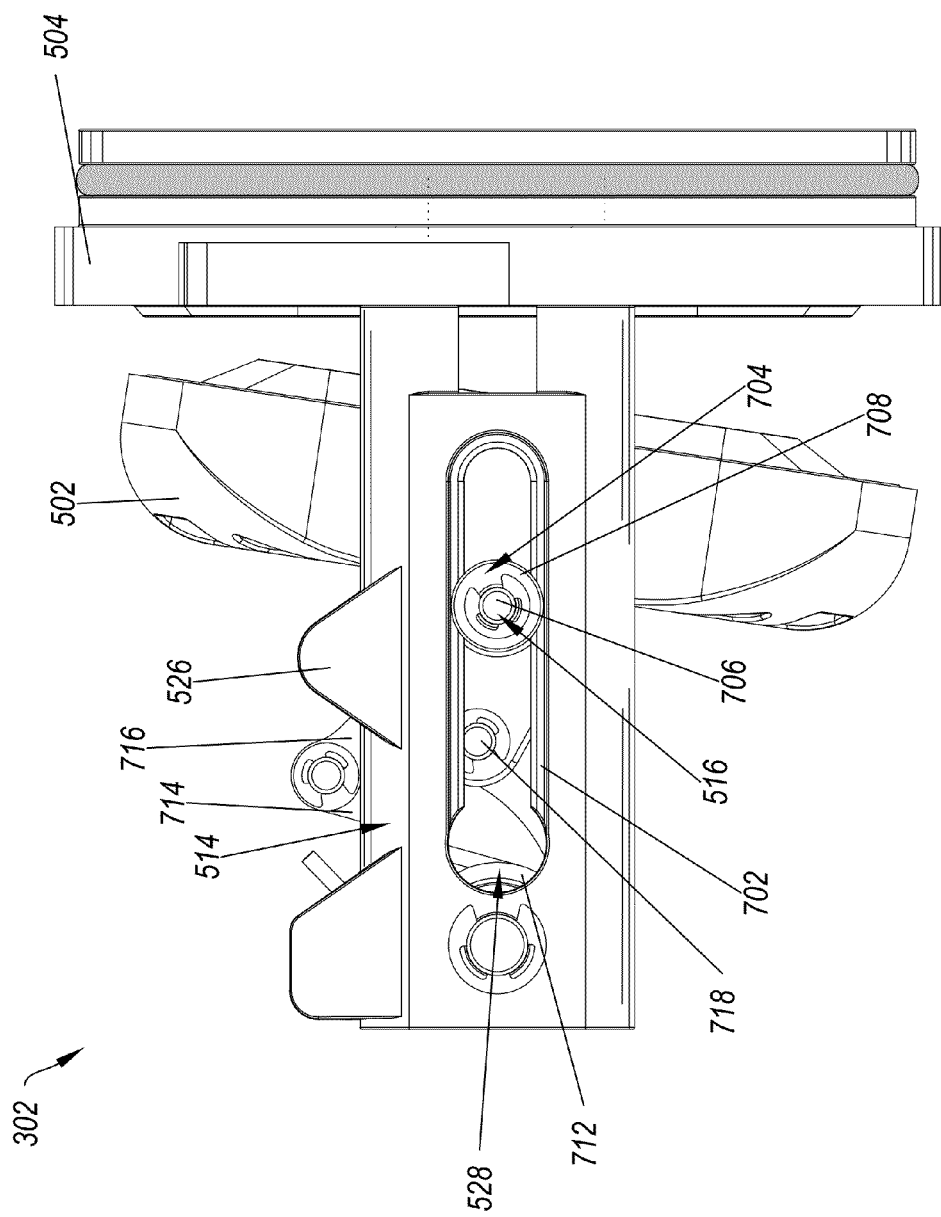

CHECK VALVE IN BACKFLOW PREVENTION DEVICE

CROSS-REFERENCE TO RELATED APPLICATIONS

This application is related to co-pending U.S. application Ser. No. 13/705,024, filed on Dec. 4, 2012, and entitled, "ACCESS COVER IN BACKFLOW PREVENTION DEVICE", which application is incorporated herein by reference in its entirety.

This application is related to co-pending U.S. application Ser. No. 13/705,033, filed on Dec. 4, 2012, and entitled, "SHUTOFF VALVE IN BACKFLOW PREVENTION DEVICE", which application is incorporated herein by reference in its entirety.

BACKGROUND OF THE INVENTION

Backflow prevention devices are widely used to prevent undesirable flow reversal under low flow, static or backpressure situations wherein clean upstream fluid sources can be contaminated by downstream fluid. Backflow prevention devices typically comprise one or two check valves, housed within a valve body, which undergo closure under backflow, backpressure or back siphonage conditions. The use of backflow prevention devices is generally required by law for cross-connected water supplies where potable water could undergo contamination due to flow reversal or back pressure conditions.

Currently used double check valve backflow preventers have proved deficient in various respects. Particularly, such backflow preventers are prone to relatively high flow losses due to the valve configurations and closure mechanisms employed, especially under low flow conditions. In particular, the motion of the check valves either causes wear over time. Poppet valves have significantly less wear. However, they interrupt the flow to a higher degree.

Further, backflow preventer assemblies typically require a bulky, heavy cast housing with a side port tube or extension and a separately cast port cover. This type of housing is expensive to manufacture and requires a substantial amount of space to accommodate the side port tube and cover. Additionally, the cover typically undergoes a high amount of pressure requiring a thicker cover with more attachment points, which makes maintenance move inconvenient and difficult.

In addition, backflow preventer assemblies typically require pressure measuring ports. These ports allow measurement of pressure in each region of the backflow preventer to ensure proper operation. However, these ports require space between components of the backflow preventer assembly. This results in a longer backflow preventer assembly and, therefore, more cost in manufacture and installation. Particularly, the installation requires more space which increases the cost.

Moreover, reducing the length results in eddies within the current which can reduce the accuracy of pressure measurements. Since accuracy is essential to ensure proper operation, the typical response has been to simply refuse to shorten the length of the backflow preventer assembly. This contravenes the desire to reduce the flow length of the backflow preventer assembly, as described above.

Additionally, the increased length and material required in manufacture increases the weight of the backflow preventer assembly. This increases the difficulty in installing the backflow preventer assembly. Typically multiple people or an ad hoc support device are required simply to hold the assembly in the required position during assembly. This increases the installation time and cost.

Accordingly, there is a need in the art for a backflow preventer assembly which is compact and light weight. Further, there is a need in the art for a backflow preventer assembly which allows for accurate pressure measurement in each region, despite its compact nature. Moreover, there is a need in the art for a backflow preventer assembly which is easy and inexpensive to manufacture. Additionally, there is a need in the art for a backflow preventer assembly which provides easy access to internal check valves. Likewise, there is a need in the art for a backflow preventer assembly which has check valves with simple low-friction closure mechanisms. Furthermore, there is a need in the art for a backflow preventer assembly which provides low flow losses.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a backflow prevention device. The backflow prevention device includes a housing defining a water flow stream. The backflow prevention device also includes an upstream shutoff valve configured to allow a user to control the water flow stream through the housing. The backflow prevention device further includes a check valve module. The check valve module is located within the housing downstream of the upstream shutoff valve. The check valve module includes an orifice, where the orifice is configured to allow the water flow stream through the check valve module. The check valve module also includes a clapper. The clapper is configured to allow the water flow stream through the orifice when open and prevent the water flow stream through the orifice when in a closed position by mating with the orifice. The check valve module further includes a fulcrum apparatus about which the clapper is allowed to rotate, a rotational constraint apparatus which directs the rotation of the clapper and a lateral constraint apparatus which directs the motion of the fulcrum toward and away from the orifice. The backflow prevention device additionally includes a downstream shutoff valve located downstream of the check valve module and configured to allow a user to control the water flow stream through the housing.

Another example embodiment includes a backflow prevention device. The backflow prevention device includes a housing defining a water flow stream. The backflow prevention device also includes an upstream shutoff valve configured to allow a user to control the water flow stream through the housing. The backflow prevention device further includes a check valve module. The check valve module is located within the housing downstream of the upstream shutoff valve. The check valve module includes an orifice, where the orifice is configured to allow the water flow stream through the check valve module. The check valve module also includes a clapper. The clapper is configured to allow the water flow stream through the orifice when open and prevent the water flow stream through the orifice when in a closed position by mating with the orifice. The check valve module further includes a fulcrum apparatus about which the clapper is allowed to rotate, a rotational constraint apparatus which directs the rotation of the clapper and a lateral constraint apparatus which directs the motion of the fulcrum toward and away from the orifice. The motion of the clapper from the closed position to the open position is a hybrid motion. The backflow prevention device additionally includes a downstream shutoff valve located downstream of the check valve module and configured to allow a user to control the water flow stream through the housing.

Another example embodiment includes a backflow prevention device. The backflow prevention device includes a housing defining a water flow stream. The backflow prevention device also includes an upstream shutoff valve configured to allow a user to control the water flow stream through the housing. The backflow prevention device further includes a check valve module. The check valve module is located within the housing downstream of the upstream shutoff valve. The check valve module includes a seat configured to mate with a portion of the housing and an orifice, where the orifice is configured to allow the water flow stream through the check valve module. The check valve module also includes a clapper. The clapper is configured to allow the water flow stream through the orifice when open and prevent the water flow stream through the orifice when in a closed position by mating with the orifice. The check valve module further includes a fulcrum apparatus about which the clapper is allowed to rotate, a rotational constraint apparatus which directs the rotation of the clapper and a lateral constraint apparatus which directs the motion of the fulcrum toward and away from the orifice. The check valve module additionally includes a bias configured to hold the clapper in the closed position a predetermined upstream pressure exists. The motion of the clapper from the closed position to the open position is a hybrid motion. The backflow prevention device additionally includes a downstream shutoff valve located downstream of the check valve module and configured to allow a user to control the water flow stream through the housing.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 2B illustrates an upstream perspective view of the example of a reduced pressure assembly;

FIG. 7C illustrates a side view of the alternative example of a check valve module.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
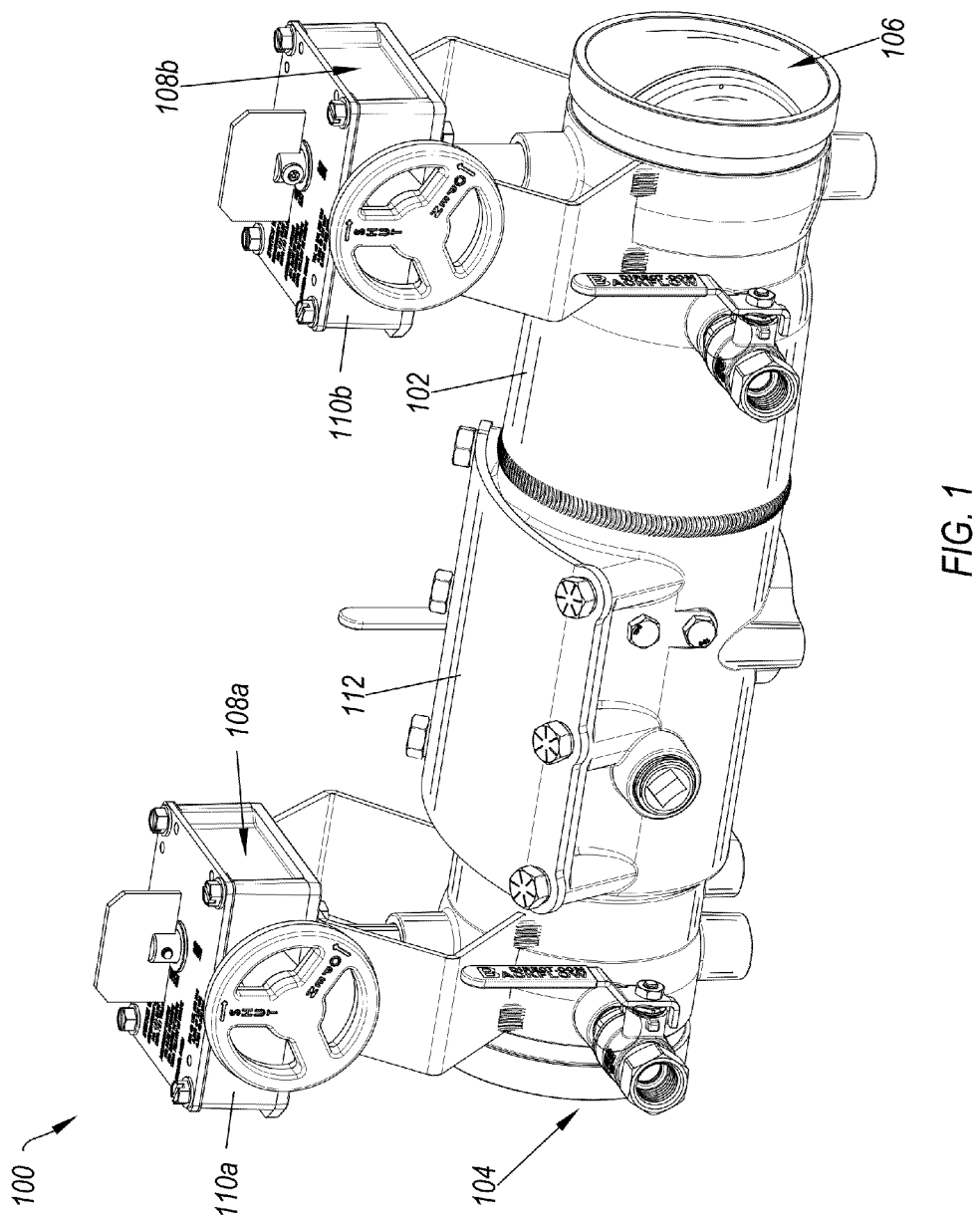
FIG. 1 illustrates an example of a double check assembly.

FIG. 1 illustrates an example of a double check assembly 100. In at least one implementation, the double check assembly 100 includes two check valves, which allow flow in one direction, but prevent flow in the opposite direction. The double check assembly is one example of a backflow prevention device which is configured to protect water supplies from contamination. In particular, the double check assembly 100 can include a backflow prevention redundancy. I.e., one check valve will still act, even if the other is jammed wide open.

FIG. 1 shows that the double check assembly 100 can include a housing 102. In at least one implementation, the housing 102 is configured to contain the water flow within the double check assembly 100. I.e., the housing 102 must be of sufficient strength to ensure that the double check assembly 100 can withstand the pressure of the water supply. Additionally or alternatively, the housing 102 is configured to align the other components of the double check assembly 100. I.e., the housing 102 can allow the internal and external components of the double check assembly 100 to be installed and proper spacing to be maintained among the components.

FIG. 1 also shows that the double check assembly 100 can include an inlet 104. In at least one implementation, the inlet 104 is configured to receive a water supply. I.e., the inlet 104 can be connected to a water supply and receive the water flow. In particular, the inlet 104 can include one or more coupling mechanisms which allow the double check assembly 100 to be connected to pipes, hoses or other devices which are configured to supply water. For example, the inlet 104 can include threading, grooves, flanges or other structures which allow attachment to the water supply.

FIG. 1 further shows that the double check assembly 100 can include an outlet 106. In at least one implementation, the outlet 106 is configured to output water. I.e., the outlet 106 can be connected as a water supply to a building or other area. In particular, the outlet 106 can include one or more coupling mechanisms which allow the double check assembly to be connected to pipes, hoses or other devices which are configured to receive water. For example, the outlet 106 can include threading, grooves, flanges or other structures which allow attachment to the water output.

FIG. 1 additionally shows that the double check assembly 100 can include an upstream shutoff valve 108a and a downstream shutoff valve 108b (collectively "shutoff valves 108"). In at least one implementation, the shutoff valves 108 can be used to control or regulate water flow through the double check assembly 100. I.e., a user can close the upstream shutoff valve 108a, the downstream shutoff valve 108b or both as needed to control water flow. For example, closure of the upstream and downstream shutoff valves 108a can allow maintenance of the double check assembly 100. Additionally or alternatively, shutoff of the downstream valve can allow a user to shutoff water supply to the pipe, hose or other device connected to the outlet 106 and, therefore, any building or structure receiving the water supply. One of skill in the art will appreciate that the shutoff valves 108 can be located within the housing or can be external to the housing, as desired.

FIG. 1 moreover shows that the upstream shutoff valve 108a and the downstream shutoff valve 108b can include a first control 110a and a second control 110a (collectively "controls 110"), respectively. In at least one implementation, the controls 110 can allow a user to open or close the shutoff valves 108. I.e., the controls 110 can include a handle or other device which allows a user to either close or open the shutoff valve, as desired. Additionally or alternatively, the controls 110a can include a wired switch or sensor to connect the controls 110 to an alarm. In particular, the switch or sensor connected to the controls 110 can signal an alarm if either of the shut-off valves 108 is in the opened or closed position.

FIG. 1 also shows that the double check assembly 100 can include a cover 112. In at least one implementation, the cover 112 can be configured to close an access port in the housing 102. In particular, the cover 112 can be removed to allow maintenance or replacement of components within the housing 102. I.e., a user can remove the cover 112 to access portions of the double check assembly 100, as described below.

Figure 2A:
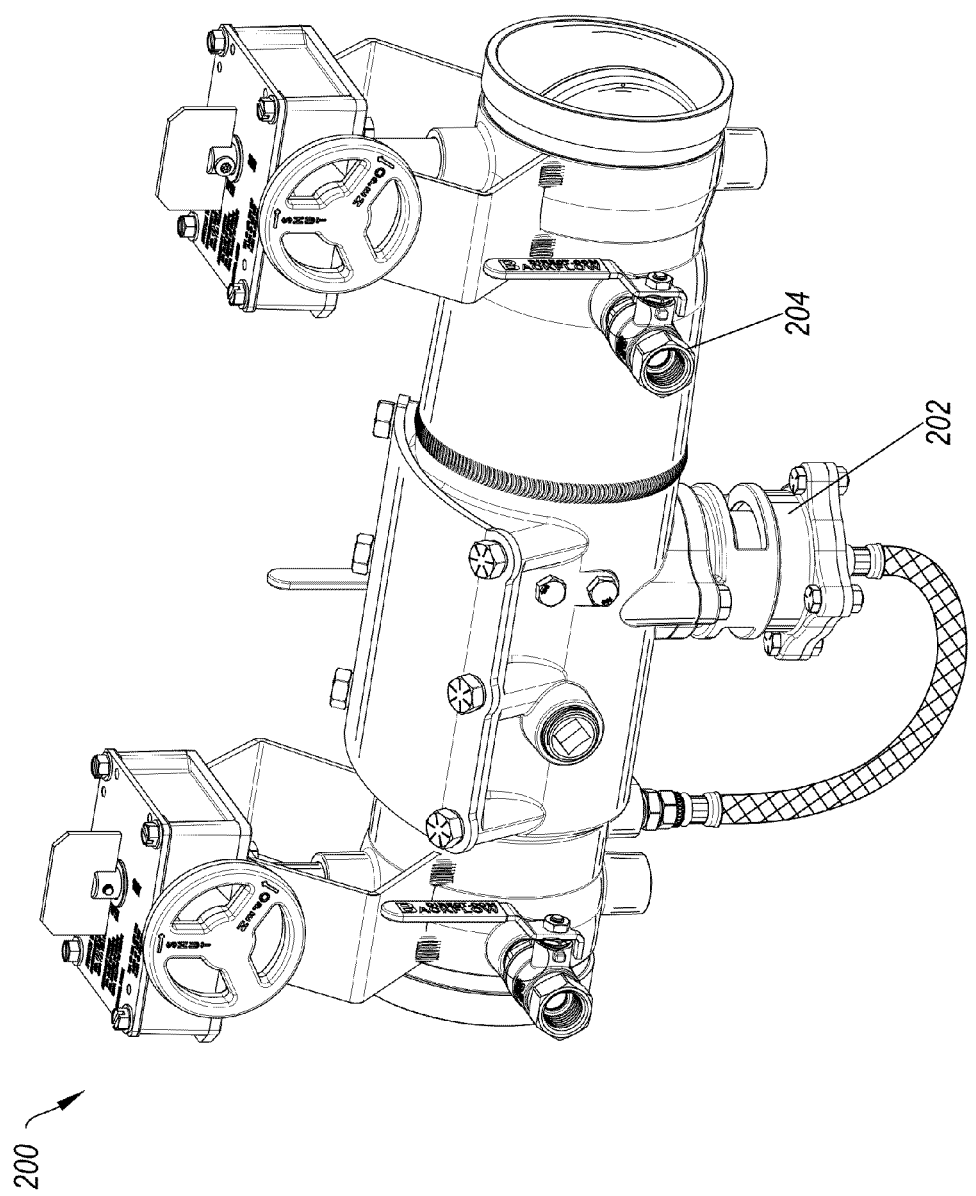
FIG. 2A illustrates a downstream perspective view of the example of a reduced pressure assembly.

FIGS. 2A and 2B illustrate an example of a reduced pressure assembly 200. FIG. 2A illustrates a downstream perspective view of the example of a reduced pressure assembly 200; and FIG. 2B illustrates an upstream perspective view of the example of a reduced pressure assembly 200. In at least one implementation, the reduced pressure assembly 200 includes two check valves, which allow water flow in one direction, but prevent water flow in the opposite direction. The reduced pressure assembly 200 is another example of a backflow prevention device which is configured to protect water supplies from contamination. In particular, the reduced pressure assembly 200 can include a backflow prevention redundancy. I.e., one check valve will still act, even if the other is jammed wide open. Additionally, a reduced pressure assembly 200 can include a first pressure zone and a second pressure zone on either end of the upstream check valve, maintained at a pressure that is lower than the water supply pressure, but high enough to be useful downstream. The pressure differential between the first pressure zone and the second pressure zone can be monitored, as described below.

FIGS. 2A and 2B further show that the reduced pressure assembly 200 can include a relief valve 202. In at least one implementation, the relief valve 202 can indicate if one or more components of the reduced pressure assembly 200 have failed. In particular, different zones within the reduced pressure assembly 200 have different pressures under normal operating conditions. If the pressure differential is disturbed, the relief valve 202 will open and discharge water to atmosphere serving as an indication of the failure.

FIGS. 2A and 2B additionally show that the reduced pressure assembly 200 can include one or more sensing ports 204. In at least one implementation, the one or more sensing ports 204 can allow the pressure in areas of the reduced pressure assembly 200 to be checked or tested. I.e., the one or more sensing ports 204 allow for the connection of a mechanical, hydraulic or electronic device which can measure the pressure in the zone to which the sensing port 204 is attached.

Figure 3A:
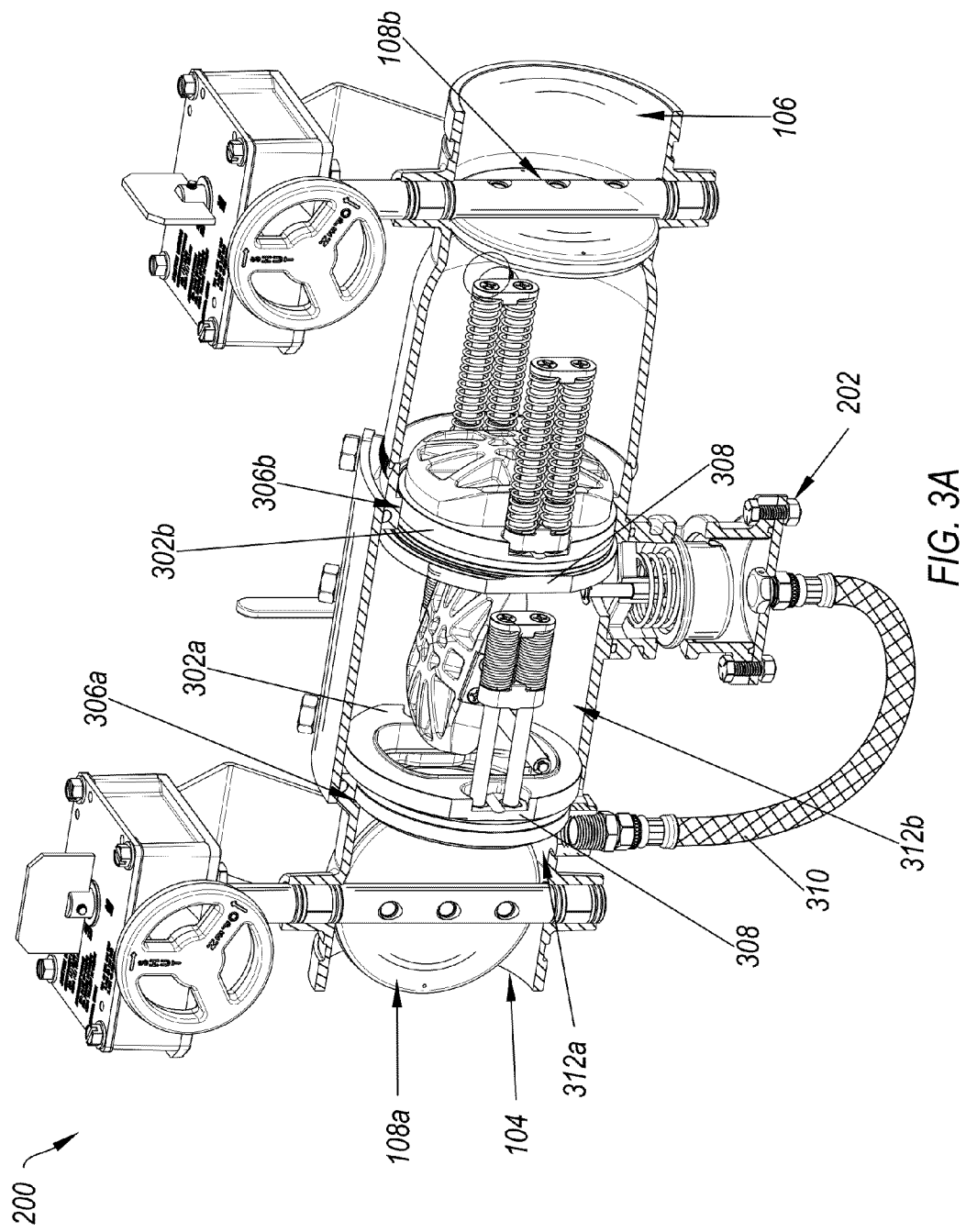
FIG. 3A illustrates a downstream perspective view of the cross-sectional view of a reduced pressure assembly.
Figure 3B:
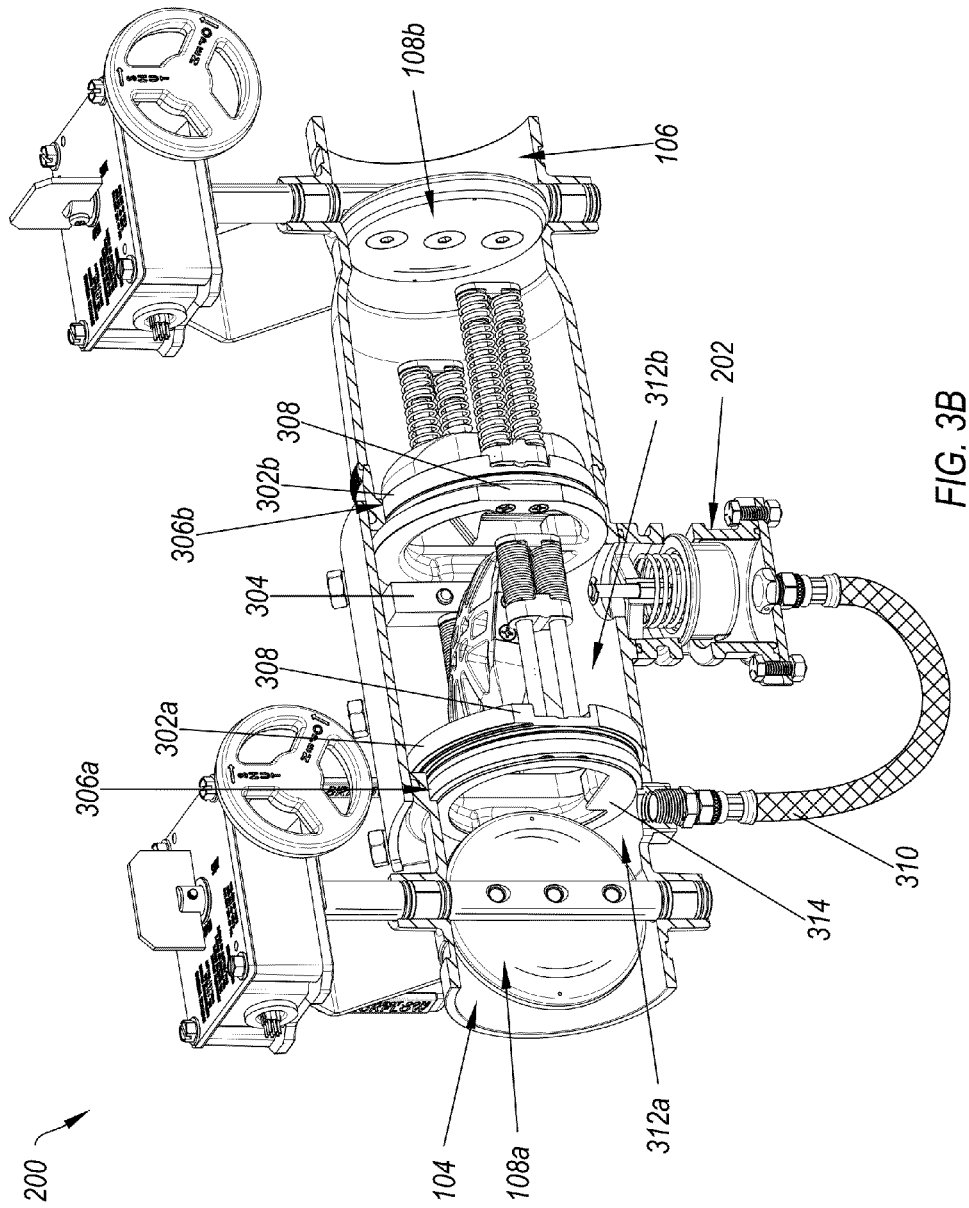
FIG. 3B illustrates an upstream perspective view of the cross-sectional view of a reduced pressure assembly.

FIGS. 3A and 3B illustrate a cross-sectional view of a reduced pressure assembly 200. FIG. 3A illustrates a downstream perspective view of the cross-sectional view of a reduced pressure assembly 200; and FIG. 3B illustrates an upstream perspective view of the cross-sectional view of a reduced pressure assembly 200. One of skill in the art will appreciate that much of the discussion of FIGS. 3A and 3B will be equally applicable to a double check assembly, such as the double check assembly 100 of FIG. 1. In at least one implementation, the reduced pressure assembly 200 allows forward flow when upstream pressure is greater than downstream pressure. In contrast, the reduced pressure assembly 200 prevents backward flow when downstream pressure is greater than upstream pressure.

FIGS. 3A and 3B show that the reduced pressure assembly 200 can include an upstream check valve module 302a and a downstream check valve module 302b (collectively "check valve modules 302"). In at least one implementation, the check valve modules 302 can prevent reverse flow within the reduced pressure assembly 200. I.e., the check valve modules 302 can be configured to allow water to flow in a forward direction (left to right as shown in FIGS. 3A and 3B) and prevent water flow in the reverse direction (right to left as shown in FIGS. 3A and 3B).

FIGS. 3A and 3B also show that the reduced pressure assembly 200 can include a check retainer 304. In at least one implementation, the check retainer 304 is configured to prevent motion of the upstream check valve module 302a toward the downstream check valve module 302b and vice versa. In particular, the check retainer 304 resists lateral forces but can be disconnected from the housing 102 and/or removed through the access port in the housing 102. Removal of the check retainer 304 can allow for removal of the upstream check valve module 302a and/or the downstream check valve module 302b, as desired.

FIGS. 3A and 3B further show that the reduced pressure assembly 200 can include an upstream receptacle 306a and a downstream receptacle 306b (collectively "receptacles 306"). In at least one implementation, the upstream receptacle 306a and the downstream receptacle 306b can be configured to receive the upstream check valve module 302a and the downstream check valve module 302b, respectively. Additionally or alternatively, the receptacles 306 prevent movement of the check valve modules 302 away from one another. For example, the receptacles 306 can include a portion of the housing which includes a narrower inner diameter relative to a nearby location, such that a portion of the check valve modules 302 cannot be inserted. I.e., the receptacles 306 can include a lip or other feature which prevents over insertion of the check valve modules 302.

FIGS. 3A and 3B additionally show that the check valve modules 302 can include a flat portion 308. In at least one implementation, the flat portion 308 is configured to prevent rotation of the check valve modules 302 relative to the receptacles 306. I.e., the flat portion 308 can ensure that the check valve modules 302 fit in only one manner within the compartments 106. One of skill in the art will appreciate that the flat portion 308 is exemplary only and that other mechanisms for preventing rotation are contemplated herein.

FIGS. 3A and 3B moreover show that the shutoff valves 108 can allow a user to prevent flow through either the inlet 104, the outlet 106 or both. In at least one implementation, the shutoff valve 108 can sealingly engage the housing 102 in a closed position, which prevents water flow through the housing 102. I.e., the shutoff valves 108 can form a seal with the housing 102 which prevents all flow in both directions, as described below.

FIGS. 3A and 3B also show that the relief valve 202 can include a sensing line 310. In at least one implementation, the sensing line 310 can connect to the volume between the upstream shutoff valve 108a and the upstream check valve module 302a, a first pressure zone 312a, and the relief valve 202. The relief valve 202 is likewise connected to the volume between the upstream check valve module 302a and the downstream check valve module 302b, a second pressure zone 312b. In at least one implementation, the water flow will lose pressure as it flows through the upstream check valve 302a. I.e., the first pressure zone 312a, by design, has a higher pressure than the second pressure zone 312b when water is flowing in the forward direction. For example, the first pressure zone 312a can be approximately 40 psi and the second pressure zone 312b can be approximately 33 psi resulting in a pressure differential of approximately 7 psi. As used in the specification and the claims, the term approximately shall mean that the value is within 10% of the stated value, unless otherwise specified. If the pressure loss or differential between the first pressure zone 312a and second pressure zone 312b decreases below a predetermined threshold the relief valve 202 will discharge, which is an indication that the upstream check valve module 302a has failed or that a backflow condition is occurring.

FIGS. 3A and 3B further show that the reduced pressure assembly 200 can include a flow plate 314. In at least one implementation, the flow plate 314 can modify the flow near the upstream check valve module 302a. For example, the flow plate 314 can include an opening that allows the majority of the flow to pass through the flow plate 314 and a blockage that stops a portion of the flow near the intake of the relief valve 202. Additionally or alternatively, the flow plate 314 can include a blockage place over a portion of the opening in the check valve module 302. The blockage can ensure that the relief valve 202 is not susceptible to eddies, currents, or pressure fluctuations caused within the housing 102 during operational conditions, but instead senses consistent and steady pressure in the first pressure zone 312a. The flow plate 314 can be attached to the housing 102 or secured in some other way. For example, the flow plate 314 can be secured in position by the mating of the upstream check valve module 302a and the housing 102.

Figure 4A:
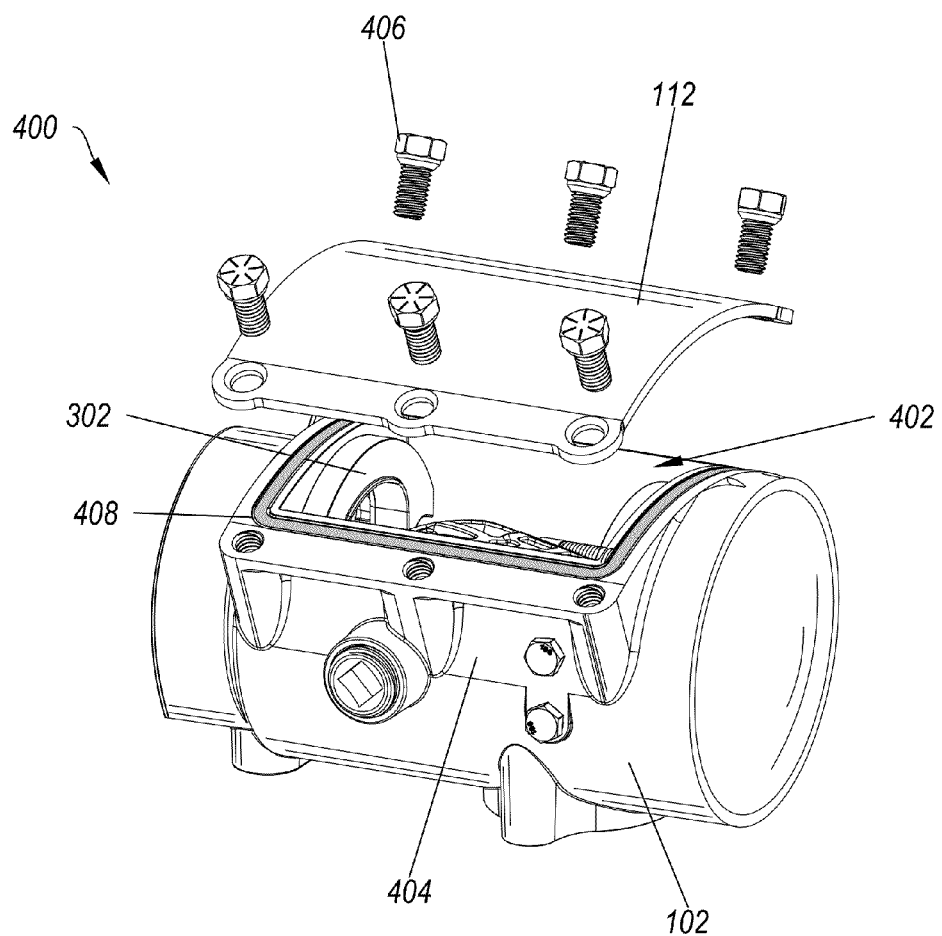
FIG. 4A illustrates an exploded top perspective view of the opening of a backflow prevention device.
Figure 4B:
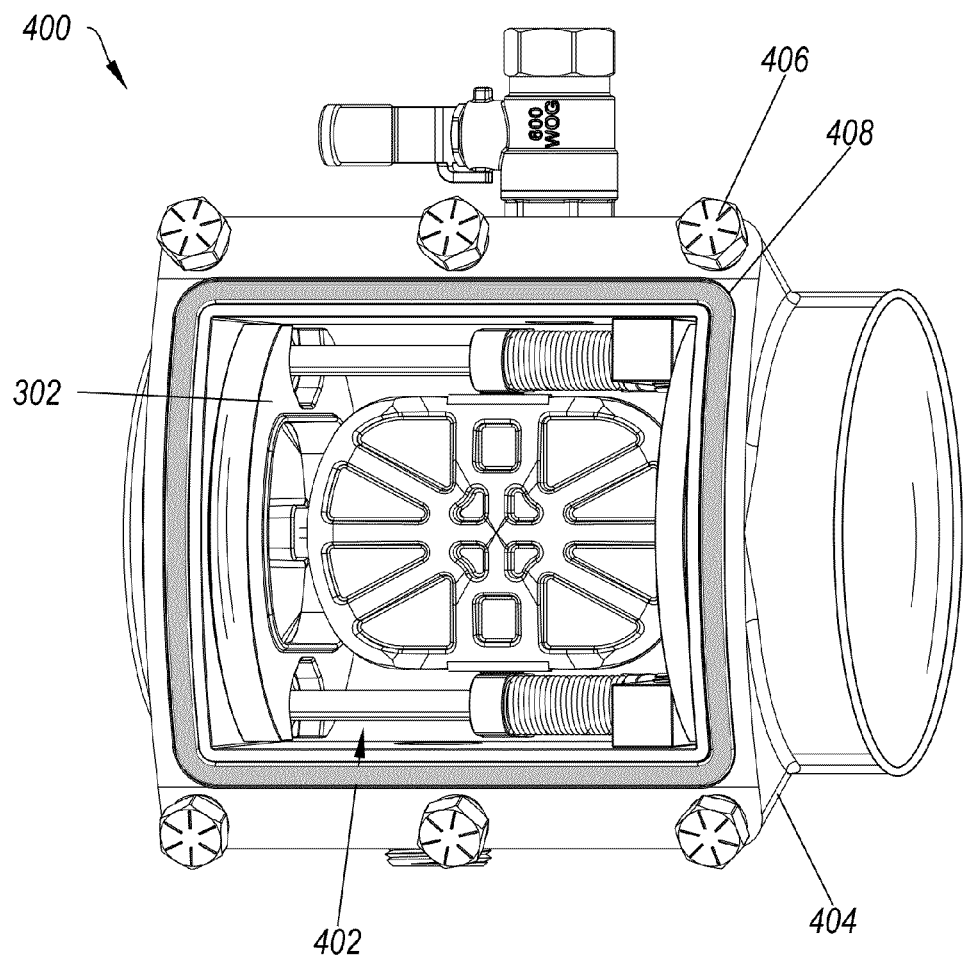
FIG. 4B illustrates a top view of the opening of a backflow prevention device without the cover.

FIGS. 4A and 4B illustrate an opening 400 of a backflow prevention device. FIG. 4A illustrates an exploded top perspective view of the opening 400 of a backflow prevention device; and FIG. 4B illustrates a top view of the opening 400 of a backflow prevention device without the cover 112. In at least one implementation, opening 400 can allow a user to access the interior of the backflow prevention device. I.e., the opening 400 can allow the user to access portions of the backflow prevention device which are normally inaccessible, either to ensure proper operation or to perform maintenance. For example, the opening 400 can allow a user to remove or install either of the check valve modules 302.

FIGS. 4A and 4B show that the opening 400 can include an access port 402. In at least one implementation, the access port can include a segment of the housing 102 which is open. I.e., a portion of the housing 102 can be missing, forming the access port 402. The access port 402 can allow the removal or insertion of components of the backflow prevention device or can allow the components to be checked or maintained. For example, the access port 402 can be a similar width as the housing 102. I.e., the access port 402 can include a portion of a half cylinder of the housing 102 which is not present.

FIGS. 4A and 4B also show that the opening 400 can include a cover mount 404. In at least one implementation, the cover mount 404 can allow a cover to be attached, as described below. In particular, the cover mount 404 can form or be proximate to the sides of the access port 402. I.e., the cover mount 404 can be located at antipodal points along the housing 102 near the access port 402. An antipodal point of a point on the surface of a circle is the point which is diametrically opposite to it—so situated that a line drawn from the one to the other passes through the center of the circle and forms a true diameter.

FIGS. 4A and 4B further show that the opening 400 can include a cover 112. In at least one implementation, the cover 112 has a bend or curvature to it, with the radius of curvature being larger than the radius of curvature of the housing 102 at the opening 400. For example, the cover 112 can include a portion of a lateral surface of a right cylinder. The lateral surface of a cylinder includes the curved portion of the cylinder. I.e., the outer surface of the cylinder excluding the bases. The cylinder need not be a circular cylinder. I.e., the cylinder can include an elliptical cylinder, an extruded polygon or otherwise include straight edges, as desired.

One of skill in the art will appreciate that adding curvature to the cover 112 creates tangential tensile stresses when under pressure rather than bending moment stresses, typical of flat covers of similar purpose. I.e., the convex nature of the cover 112 allows the cover 112 to equalize the pressure over the entire surface, allowing the cover 112 to be thinner than if the cover 112 were flat. That is, a flat cover 112 would deform, to some degree, under pressure. In contrast, the curvature reduces the deformation of the cover 112. Additionally or alternatively, the force imparted by the water within the housing is less likely to cause separation of the cover 112 from the housing 102.

FIGS. 4A and 4B additionally show that the opening 400 can include an attachment 406. In at least one implementation, the attachment 406 is configured to attach the cover 112 to the cover mount 404. For example, the attachment 406 can include bolts, screws, clips, clamps or any other desired attachment. One of skill in the art will appreciate that the attachment 406 can be secured along the edges of the cover 112. I.e., no support structure is necessary within the access port 402, allowing a user to more easily access the interior portions of the backflow prevention device. One of skill in the art will further appreciate that the curvature of the cover 112 allows the cover 112 to cover a longer distance without requiring the thickness of a flat cover. That is, the same thickness of cover 112 can have a longer distance between attachments 406 because of the curvature of cover 112 relative to a flat cover 112.

FIGS. 4A and 4B moreover show that the opening 400 can include a seal 408. In at least one implementation, the seal 408 can sealingly engage the cover 112 and the housing 102 along the perimeter of the cover 112. That is, the seal 408 can provide a water tight connection between the cover 112 and the housing 112 when the cover is attached such that water is prevented from leaking out the cover 112 when water flows through the housing 102. For example, the seal 408 can include an elastomer or other compressible material.

Figure 5A:
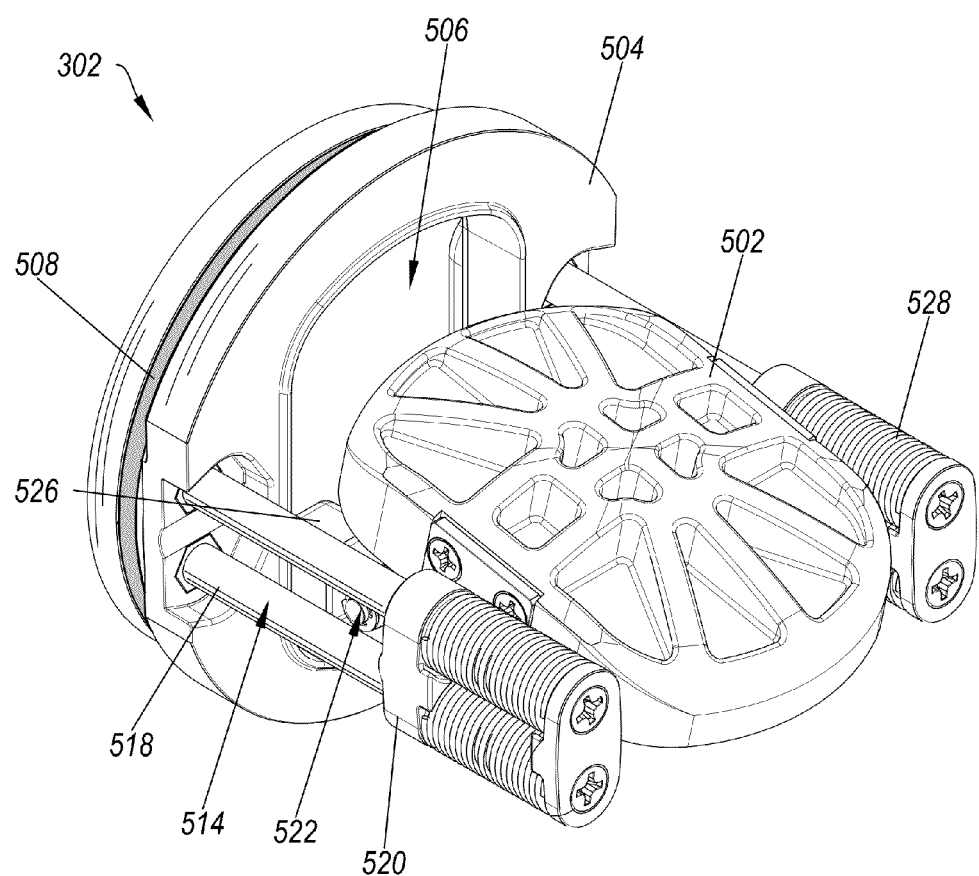
FIG. 5A illustrates a downstream top perspective view of the example of a check valve module.
Figure 5B:
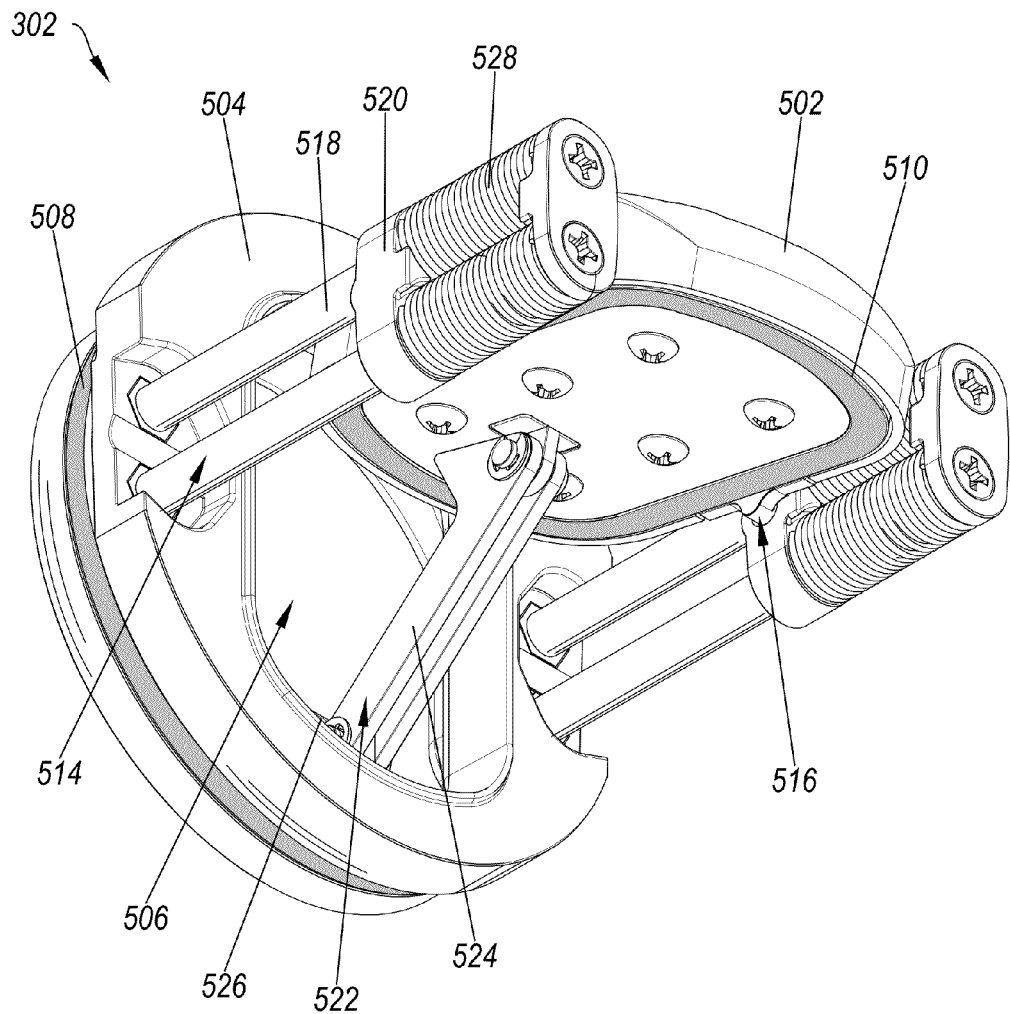
FIG. 5B illustrates a downstream bottom perspective view of the example of a check valve module.
Figure 5C:
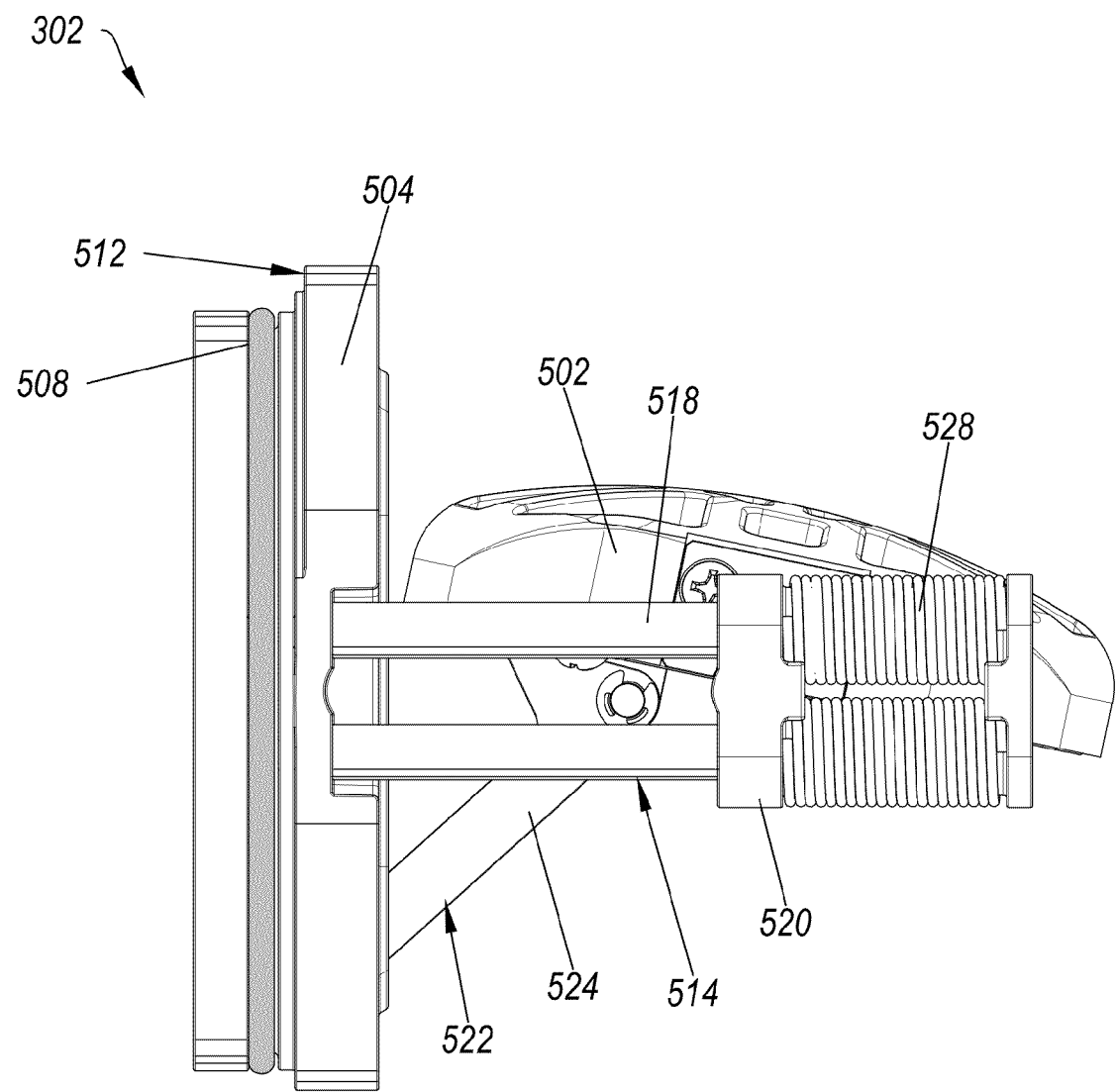
FIG. 5C illustrates a side view of the example of a check valve module.

FIGS. 5A, 5B and 5C illustrate an example of a check valve module 302. FIG. 5A illustrates a downstream top perspective view of the example of a check valve module 302; FIG.

5B illustrates a downstream bottom perspective view of the example of a check valve module 302; and FIG. 5C illustrates a side view of the example of a check valve module 302. In at least one implementation, the check valve module 302 is configured to allow fluid flow in only one direction. That is, the check valve module 302 allows fluid to flow in one direction but blocks fluid flow in the opposite direction. Preventing reverse fluid flow can prevent contamination of the fluid source and/or prevent damage from high pressure caused by reverse flow.

FIGS. 5A, 5B and 5C show that the check valve module 302 can include a clapper 502. In at least one implementation, the clapper 502 is configured to completely block the flow through the check valve module 302 when closed. In contrast, the clapper 502 is configured to allow as much flow as possible through the check valve module 302 when opened, as described below. In particular, the clapper 502 can include a large surface area which is placed perpendicular to the flow when in a closed position and a small profile or cross-sectional area which is placed within the flow when in an open position.

FIGS. 5A, 5B and 5C also show that the check valve module 302 can include a seat 504. In at least one implementation, the seat 504 is configured to mate with a portion of the housing in a backflow prevention device. For example, the seat 504 can be configured to mate with a compartment, such as the receptacles 306 of FIGS. 3A and 3B. The seat 504 can include one or more features to ensure proper orientation, such as a notch, a protrusion, a flat portion or any other feature which mates with the housing of the backflow prevention device.

FIGS. 5A, 5B and 5C further show that the check valve module 302 can include an orifice 506. In at least one implementation, the orifice 506 can include an opening through the seat 504 through which water can flow. I.e., the orifice 506 can allow water to flow when the clapper 502 is in the open position. Likewise, the orifice 506 can include a lip or other feature to create a seal with the clapper 502 in the closed position, as described below.

FIGS. 5A, 5B and 5C additionally show that the check valve module 302 can include a seal 508. In at least one implementation, the seal 508 is configured to prevent any leakage at the joint between the seat 504 and the housing of the backflow prevention device. For example, the seal 508 can include an O-ring. In at least one implementation, an O-ring, also known as a packing, or a toric joint, is a mechanical gasket in the shape of a torus. I.e., it is a loop of elastomer with a disc-shaped cross-section, designed to be seated in the groove and compressed during assembly between two or more parts, creating a seal at the interface.

FIGS. 5A, 5B and 5C moreover show that the clapper 502 can include an elastomer disk 510. In at least one implementation, the elastomer disk 510 can allow a seal between the clapper 502 and the seat 504 when the clapper 502 is in the closed position. In particular, the elastomer disk 510 can be pressed against the seat 504 to prevent any water leakage when the clapper 502 is in the closed position. For example, the elastomer disk 510 can be pressed against a lip or other feature of the orifice 506, as described above.

FIGS. 5A, 5B and 5C also show that the check valve module 302 can include a stop 512. In at least one implementation, the stop 512 can prevent over insertion of the check valve module 302. I.e., as the check valve module 302 is pressed into the housing of a backflow prevention device, the stop 512 comes in contact with a portion of the housing, preventing further insertion of the check valve module 302.

FIGS. 5A, 5B and 5C further show that the check valve module 302 can include a lateral constraint apparatus 514. In at least one implementation, the lateral constraint apparatus 514 can guide the motion of the clapper 502. I.e., the lateral constraint apparatus 514 can direct the motion of a rotational axis 516 when transitioning from the open position to the closed position or vice versa. In particular, the lateral constraint apparatus 514 can direct the motion of the axis 516 toward and away from the orifice 506. The lateral constraint apparatus 514 can be secured to the seat 504 such that the lateral constraint apparatus 514 is sufficiently durable to resist lateral motion of the clapper 502.

FIGS. 5A, 5B and 5C additionally show that the check valve module 302 can include the axis 516. In at least one implementation, the axis 516 can include a line about which the clapper 502 rotates. That is, the axis 516 can include an attachment point about which the clapper 502 rotates. For example, the axis 516 can include a hinge, pin, rod or any other desired mechanism. The axis 516 can move laterally relative to the seat 504 along the lateral constraint apparatus. In particular, the lateral constraint apparatus can allow motion of the axis 516 toward and away from the opening of the seat 504 when the clapper 502 is either closing or opening, respectively.

FIGS. 5A, 5B and 5C moreover show that the lateral constraint apparatus 514 can include a guide 518. In at least one implementation, the guide 518 can extend perpendicularly from the seat 504. For example, the guide 518 can include rods or shafts attached to the seat 504. The guide 518 can be of sufficient strength to ensure that the clapper 502 can be supported within the flow stream and to resist force acting on the clapper 502 during operating conditions.

FIGS. 5A, 5B and 5C also show that the lateral constraint apparatus 514 can include a fulcrum apparatus 520. In at least one implementation, the fulcrum apparatus 520 can attach the clapper 502 to the guide 518. In particular, the fulcrum apparatus 520 can move relative to the guide 518 in a direction determined or controlled by the guide 518. That is, the fulcrum apparatus 520 can constrain the attachment point of the clapper 502 to move laterally toward or away from the seat 504, while still allowing the clapper 502 to rotate about axis 516, as described below. For example, the fulcrum apparatus 514 can include a pin, configured to direct the rotation of the clapper 502. Additionally or alternatively, the fulcrum apparatus 514 can include a receiver attached to the lateral constraint apparatus 514

FIGS. 5A, 5B and 5C further show that the check valve module 302 can include a rotational constraint apparatus 522. In at least one implementation, the rotational constraint apparatus 522 can connect the clapper 502 and the seat 504. In particular, the rotational constraint apparatus 522 can cause the clapper 502 to rotate relative to the seat 504. I.e., the rotational constraint apparatus 522 controls the rotational motion of the clapper 502 during the opening or closing of the clapper 502.

FIGS. 5A, 5B and 5C additionally show that the rotational constraint apparatus 522 can include a rotational linkage 524. In at least one implementation, the rotational linkage 524 can cause the clapper 502 to rotate when opening. I.e., the rotational linkage 524 can cause a portion of the clapper 502 to remain closer to the seat 504 than another portion of the clapper 502, inducing a rotational motion in the clapper 502 about axis 516. For example, the rotational linkage 524 can be attached to a position offset relative to the axis 516 on the clapper 502. That is, the rotational linkage 524 can be attached at a location other than the center point of the clapper 502.

FIGS. 5A, 5B and 5C moreover show that rotational constraint apparatus 522 can include a boss 526. In at least one implementation, the boss 526 is in contact with the rotational constraint apparatus 522 to allow the rotational constraint apparatus 522 to direct the opening or closing of the clapper 502. In particular, the boss 526 includes a clasp means or hinge. That is, the linkage 502 is attached to the boss 526 but can rotate relative to the boss 526.

FIGS. 5A, 5B and 5C also show that the check valve module 302 can include a bias 528. In at least one implementation, the bias 528 can be configured to hold the clapper 502 in the closed position. I.e., the bias 528 can push the clapper 502 toward the seat 504 absent another force. The bias 528 can constrain the clapper 502 to remain closed unless an upstream pressure exists which is greater than a predetermined threshold, allowing flow of water through the check valve module 302, called the opening point of the check valve module. I.e., the bias 528 predisposes the check valve module 302 such that the upstream pressure must exceed the downstream pressure by a predetermined amount before the clapper 502 will open. For example, the bias 528 can include a spring or other mechanism which provides a closing force on the clapper 502.

One of skill in the art will appreciate that the location of the rotational constraint apparatus 522, the lateral constraint apparatus 514, the fulcrum apparatus 520 and the bias 528 are exemplary only. That is, any combination of mechanisms which provides a rotational constraint and a linear constraint on the motion of the clapper 502 along with a bias mechanism to keep the clapper 502 predisposed to the closed position are contemplated herein, unless otherwise specified in the claims.

Figure 6A:
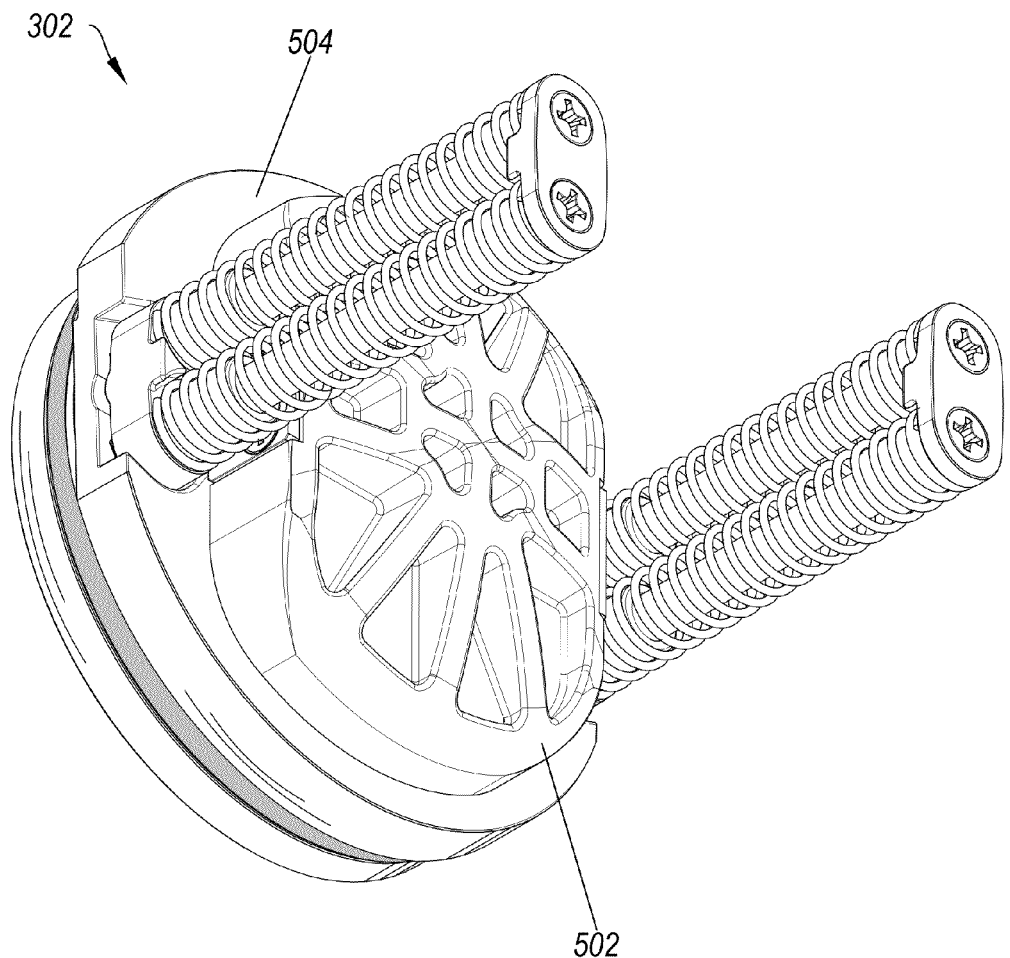
FIG. 6A illustrates an example of a check valve module 302 in a closed position.
Figure 6B:
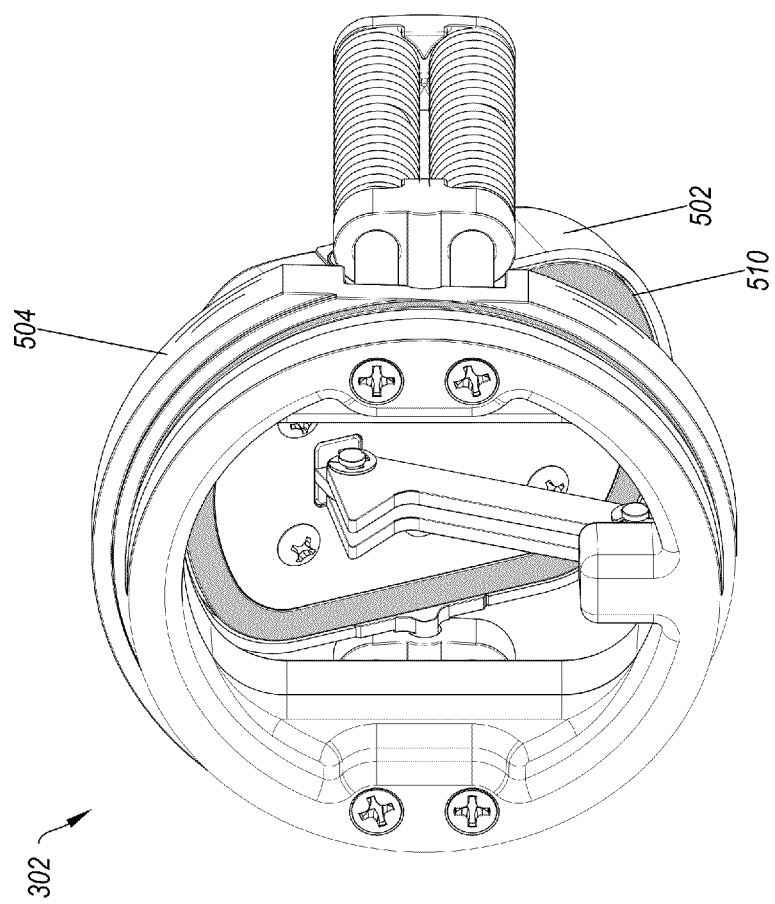
FIG. 6B illustrates an upstream perspective view of an example of a check valve module in a semi-opened position.
Figure 6C:
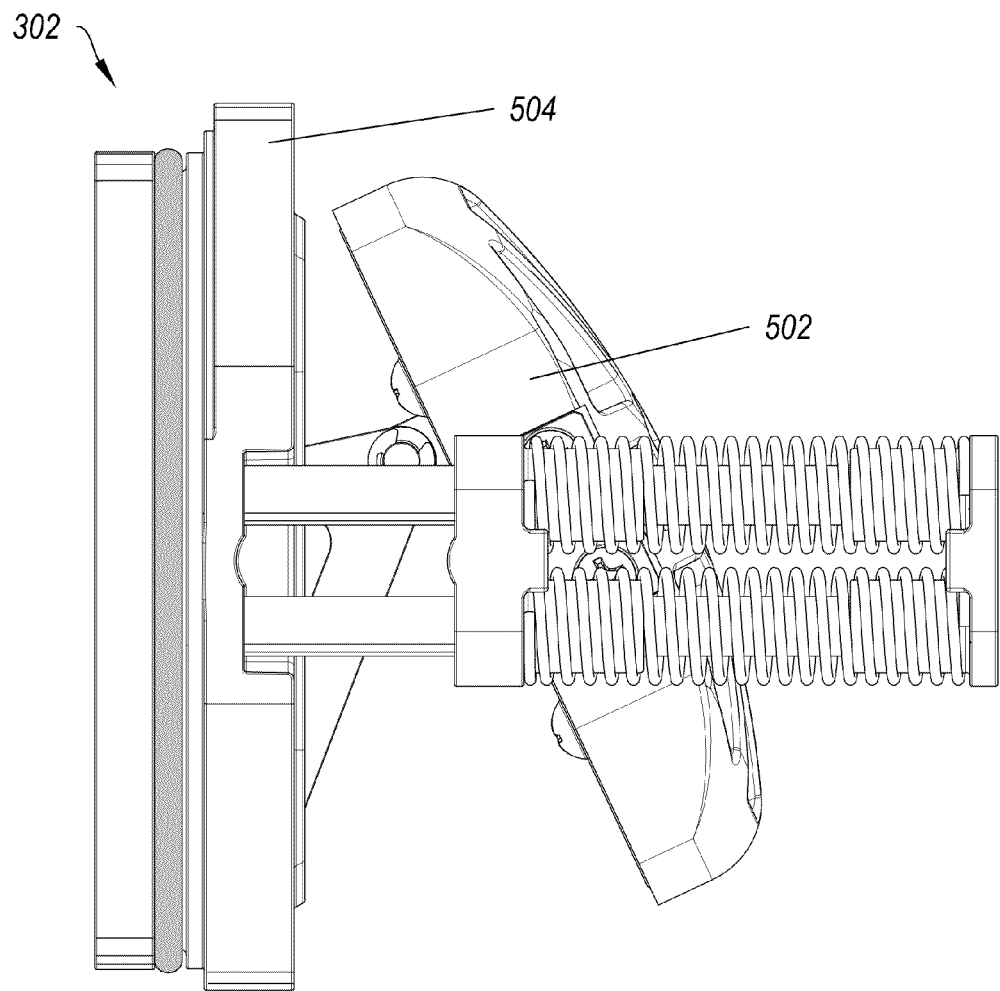
FIG. 6C illustrates a side view of an example of a check valve module in a semi-opened position.

FIGS. 6A, 6B and 6C show that the clapper 502 undergoes a hybrid movement. FIG. 6A illustrates an example of a check valve module 302 in a closed position; FIG. 6B illustrates an upstream perspective view of an example of a check valve module 302 in a semi-opened position; and FIG. 6C illustrates a side view of an example of a check valve module 302 in a semi-opened position. I.e., the clapper 502 is neither a poppet (linear motion), nor a swing check (rotational motion), but a hybrid of the two. This utilizes the advantages of both movement types, while eliminating many of the drawbacks associated with both movement types.

In a poppet valve, instead of sliding or rocking over a seat to uncover a port or seat, the poppet valve lifts from the seat with a movement perpendicular to the port or seat. The main advantage of the poppet valve is that the elastomer disk 510 of the clapper 502 has no lateral movement on the seat 504, thus reducing the wear on the elastomer disk 510 and increasing the life cycle of the check valve module 302. In addition, the force applied to the clapper 502 during this poppet style motion is balanced and linear providing more consistent force at the opening point of the check valve module. I.e., less force is needed to move the poppet because some forces on the poppet are nullified by equal and opposite forces. I.e., the opening force has to counteract only a spring or other biasing force. However, the poppet valve has a significant disadvantage in that the clapper 502 remains in the middle of the water flow. That is, the water must flow around a poppet valve which causes severe pressure loss and/or friction loss through the backflow preventer under normal operating conditions.

In a swing check valve or tilting disc check valve, the movable part or clapper 502 necessary to block or control the flow, swings on a virtually fixed axis hinge or trunnion, either onto the seat 504 to block reverse flow or off the seat 504 to allow forward flow. That is, the clapper 502 is attached to the seat 504 by a hinge, about which the clapper 502 rotates. Because the clapper 502 rotates, the clapper 502 presents a thinner cross-sectional area within the water flow when in the open position. That is, a swing check valve offers less resistance to water flow or pressure loss through the check valve module 302. However, the swing check valve includes lateral motion between the elastomer disk 510 and the seat 504 as the clapper approaches the closed position, which eventually causes the seal to fail. In addition, the mechanisms associated with the closing force or closing bias of swing check valves are inherently more complex and, therefore, have greater mechanical system friction and inconsistencies than poppet style check valves. This results, in turn, in inconsistencies of critical check valve opening points associated with backflow prevention valves.

In contrast, in the current implementation utilizes a hybrid motion. I.e., the clapper 502 moves approximately perpendicularly and linearly away from the seat 504 when it initially opens. The clapper 502 then begins to rotate, minimizing the surface area interrupting fluid flow. This provides numerous benefits including; consistent closure force resulting in consistent static pressure differential across the check valve (critical to the functionality of all backflow preventers); less susceptibility to fouling at the elastomer disk 510 and valve seat 504; excellent pressure loss or friction loss under high flow conditions; and no mechanical advantage or differentially loaded mechanism so there are no low flow pressure fluctuations resulting in system alarm failures.

Figure 7A:
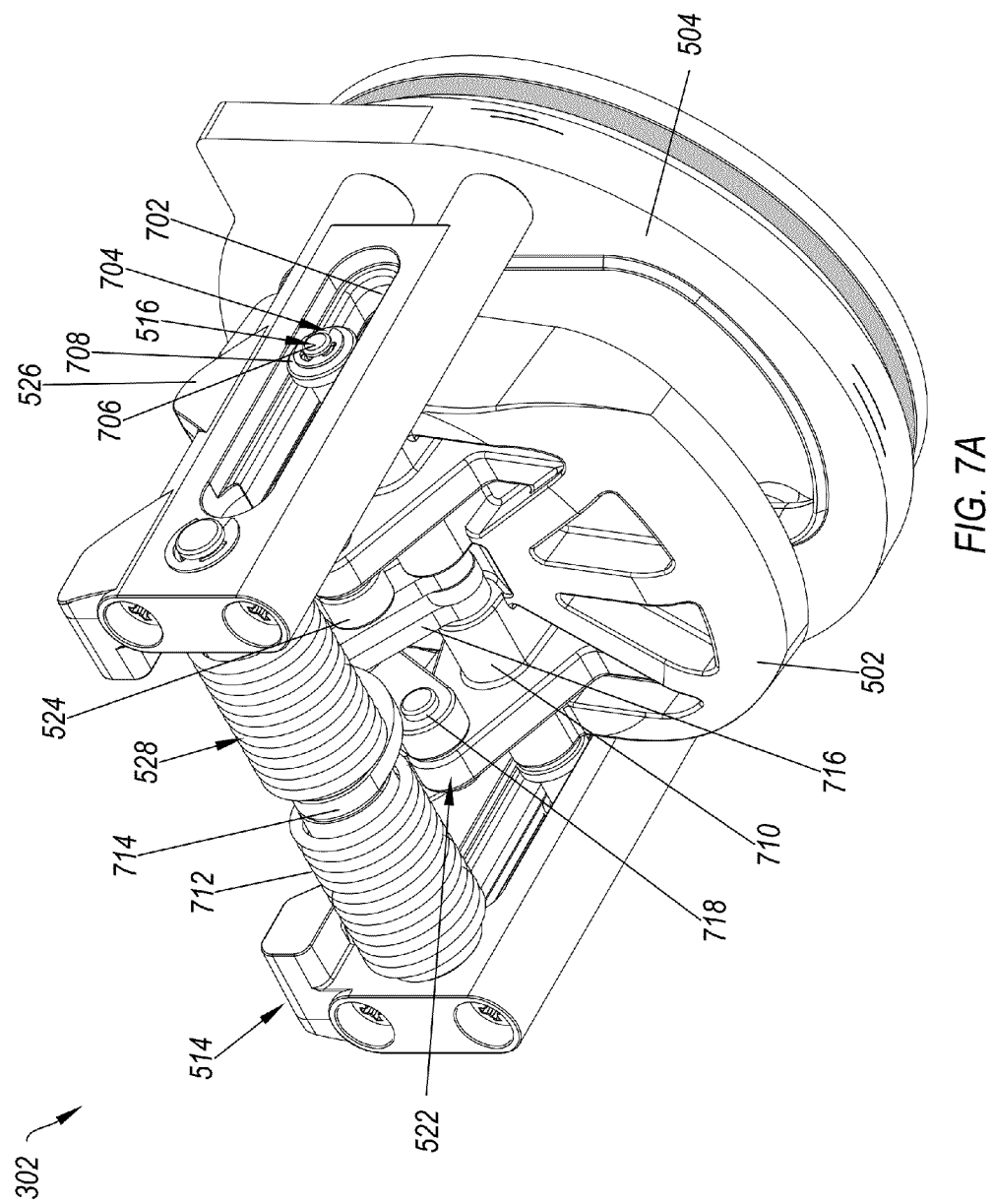
FIG. 7A illustrates a downstream bottom perspective view of an alternative example of a check valve module.
Figure 7B:
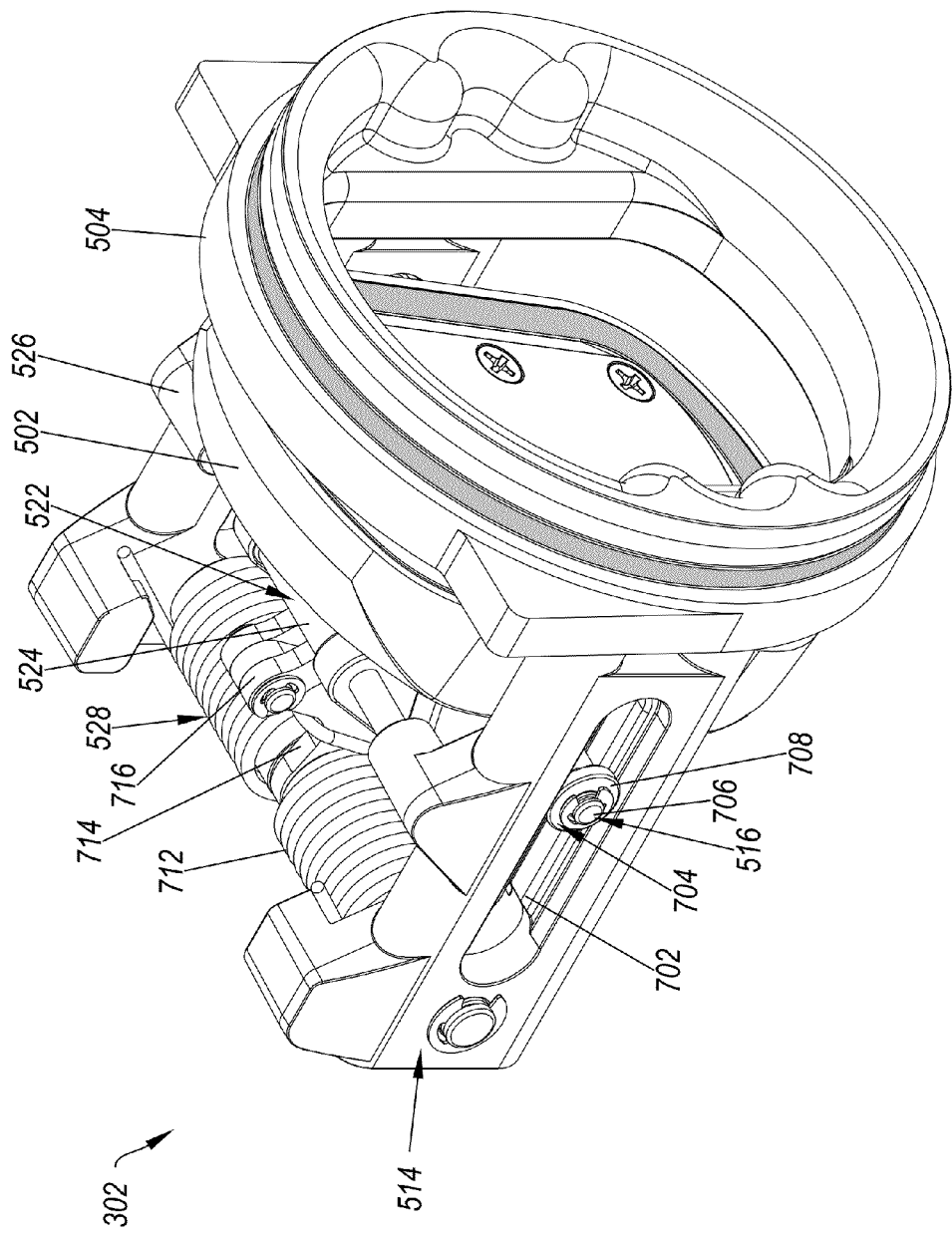
FIG. 7B illustrates an upstream top perspective view of the alternative example of a check valve module.

FIGS. 7A, 7B and 7C illustrate an alternative example of a check valve module 302. FIG. 7A illustrates a downstream bottom perspective view of the alternative example of a check valve module; FIG. 7B illustrates an upstream top perspective view of the alternative example of a check valve module; and FIG. 7C illustrates a side view of the alternative example of a check valve module. In at least one implementation, the alternative example of a check valve module 302 can allow for a decrease in the closing bias force as the clapper 502 transitions from fully closed to fully open. That is, that the closing bias force on the clapper 502 is stronger the closer the clapper is to the closed position, as discussed below.

FIGS. 7A, 7B and 7C show that the lateral constraint apparatus 514 can include a slot 702. In at least one implementation, the slot 702 can be arranged perpendicularly relative to the seat 504. The slot 702 can be of sufficient strength to ensure that the clapper 502 can be supported within the flow stream and to resist force acting on the clapper 502 during operating conditions. In particular, the slot 702 can allow the rotational axis 516 to move laterally toward and away from the seat 504.

FIGS. 7A, 7B and 7C also show that the check valve module 302 can include a fulcrum apparatus 704. In at least one implementation, the fulcrum apparatus 704 can attach the clapper 502 to the lateral constraint apparatus 514. In particular, the fulcrum apparatus 704 can move relative to the lateral constraint apparatus 514 in a direction determined or controlled by the lateral constraint apparatus 514. That is, the fulcrum apparatus 704 can constrain the attachment point of the clapper 502 to move laterally toward or away from the seat 504, while still allowing the clapper 502 to rotate about axis 516 of the pin 706.

FIGS. 7A, 7B and 7C further show that the fulcrum apparatus 704 can include a pin 706. In at least one implementation, the pin 706 can be placed within the slot 702 to act as the rotational axis 516. In particular, a portion of the pin 706 can extend through the slot 702 and be secured. The pin 706 is then allowed to move and rotate relative to the slot 702 but is retained within the slot 702.

FIGS. 7A, 7B and 7C additionally show that the fulcrum apparatus 704 can include a roller 708. In at least one implementation, the roller 708 can secure the pin 706 within the slot 702. I.e., the roller 708 can ensure that a portion of the pin 706 remains within the slot 702. Additionally or alternatively, the roller 708 can allow the pin 706 to rotate relative to the slot 702. I.e., the roller 708 can allow the pin 706 to rotate freely within the slot 702.

FIGS. 7A, 7B and 7C moreover show that the fulcrum apparatus 704 can include an attachment 710. In at least one implementation, the attachment 710 can secure the pin 706 to the clapper 502. For example, the attachment 710 can include a hole that extends partially or completely into the clapper 502. In particular, the hole 710 can allow the clapper 502 to rotate about the rotational axis 516 created by the pin 706.

FIGS. 7A, 7B and 7C also show that the bias 528 can include a torsion spring 712. In at least one implementation, the torsion spring 712 is a spring that works by torsion or twisting. That is, the torsion spring 712 includes a flexible elastic object that stores mechanical energy when it is twisted. When it is twisted, it exerts a force (actually torque) in the opposite direction, proportional to the amount (angle) it is twisted. As the clapper 502 opens, the distance and angle of force exerted by the torsion spring 712 are changed, decreasing the closing bias and lessening the distortion on the fluid flow due to closing bias.

FIGS. 7A, 7B and 7C further show that the bias 528 can include a first linkage 714. In at least one implementation, the first linkage 714 allows the torsion spring 712 to produce a force acting on the clapper 502. That is, the torsion spring 512 provides a rotational force that is close in proximity to the torsion spring 512. The first linkage 714 can convert the rotational force produced by the torsion spring 712 to a linear force that acts remotely relative to the torsion spring 512 on the clapper 502, maintaining a closing force on the clapper 502.

FIGS. 7A, 7B and 7C additionally show that the bias 528 can include a second linkage 716. In at least one implementation, the second linkage 716 can be attached to the first linkage 714 to transfer force from the torsion spring 512 to the clapper 502. I.e., the second linkage 716 can be attached to a position on the clapper 502. Because the first linkage 714 and the second linkage 716 are allowed to move relative to one another they transfer the rotational force of the torsion spring 512 to a linear closing force on the clapper 502. One of skill in the art will appreciate that the second linkage 716 can be attached to a position offset relative to the axis 516 on the clapper 502. That is, the second linkage 716 can be attached at a location other than the center point of the clapper 502.

FIGS. 7A, 7B and 7C moreover show that the rotational constraint apparatus 522 can include a boss 526. In at least one implementation, the boss 526 is in contact with the rotational constraint apparatus 522 to allow the rotational constraint apparatus 522 to direct the opening or closing of the clapper 502. In particular, the boss 526 includes a clasp means or hinge. That is, the rotational linkage 524 is attached to the boss 526 but can rotate relative to the boss 526.

FIGS. 7A, 7B and 7C also show that the rotational constraint apparatus 522 can include a rotational linkage 524. In at least one implementation, the rotational linkage 524 can cause the clapper 502 to rotate when opening. I.e., the rotational linkage 524 can cause a portion of the clapper 502 to remain closer to the seat 504 than another portion of the clapper 502, inducing a rotational motion in the clapper 502 about axis 516.

FIGS. 7A, 7B and 7C further show that the rotational constraint apparatus 522 can include an attachment 718. In at least one implementation, the attachment 718 can connect the rotational linkage 524 to the clapper 502. For example, the attachment 718 can include a pin or other desired mechanism. One of skill in the art will appreciate that the attachment 718 can connect the rotational linkage 524 to a position offset relative to the axis 516 on the clapper 502. That is, the rotational linkage 524 can be attached at a location other than the center point of the clapper 502.

Figure 8:
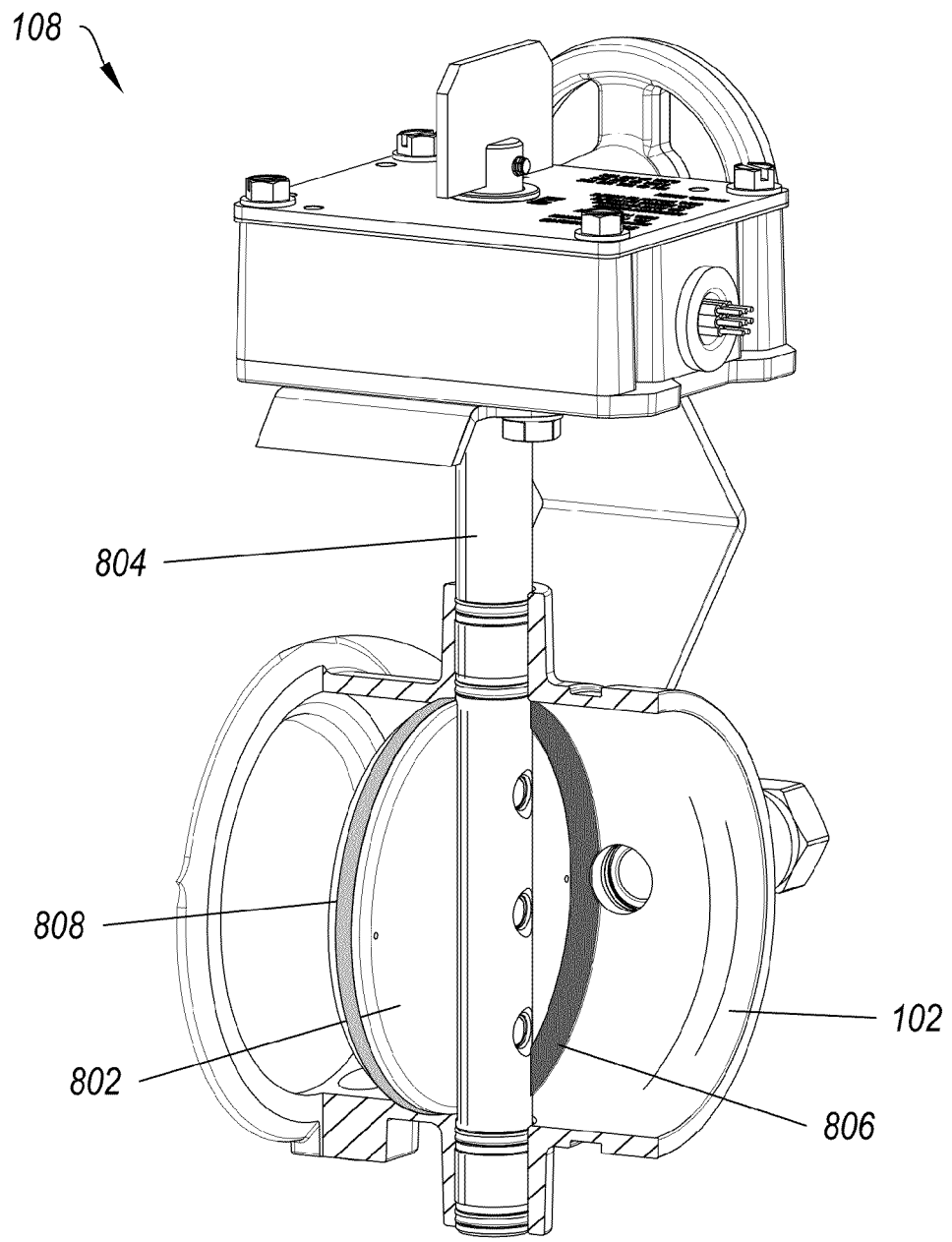
FIG. 8 illustrates an example of a shutoff valve.

FIG. 8 illustrates an example of a shutoff valve 108. In at least one implementation, the shutoff valve 108 can prevent all fluid flow. That is, the shutoff valve 108 can form a seal with the housing, 102 preventing all water flow through the backflow prevention device. For example, the shutoff valve 108 can be used to test the backflow prevention device or to perform maintenance on the backflow prevention device.

FIG. 8 also shows that the shutoff valve 108 can include a obstruction 802. In at least one implementation, the obstruction 802 can be configured to mate with the internal surface of the housing 102. I.e., the obstruction 802 can be placed perpendicular to the flow, preventing flow within the housing 102. In contrast, when the obstruction 802 is aligned parallel to the flow, the water can flow freely through the housing 102. For example, the obstruction 802 can include a disk or otherwise be shaped to match the internal shape of the housing 102.

FIG. 8 shows that the shutoff valve 108 can include a rotating means 804. In at least one implementation, the rotating means 804 can connect the obstruction 802 to the control 110. I.e., a user can use the control 110 to move the rotating means 804, which moves the obstruction 802 into the desired position. That is, rotation of the rotating means 804 results in rotation of the obstruction 802. For example, the rotating means 804 can include a shaft or other device.

In at least one implementation, the obstruction 802 can be a spherical segment. A spherical segment is the portion of a sphere cut off by two parallel planes. I.e., the edges of the obstruction 802 can be curved, forming the outer portion of a sphere. In particular, the obstruction 802 can include a spherical segment of a sphere with a diameter that is concurrent with the axis of the rotating means 804. Using a spherical segment as the obstruction 802 can allow the obstruction 802 to rotate 360 degrees within the housing 102.

FIG. 8 further shows that the housing 102 can include a sealing surface 806. In at least one implementation, the sealing surface 806 can be a section of the housing 102 which is configured to receive the obstruction 802 in the closed position. In particular, the sealing surface 806 can include a curved surface equivalent to a spherical segment. That is, the sealing surface 806 can be configured to mate with the obstruction 802 when in the closed position.

FIG. 8 additionally shows that the obstruction 802 can include a seal 808. In at least one implementation, the seal 808 can be configured to ensure drip tight mating between the obstruction 802 and the seat 806. I.e., the seal 808 can ensure that water does not leak past the obstruction 802 when in the closed position. For example, the seal 808 can include an O-ring or other compressible material.

In at least one implementation, the engagement between the seal 808 and the sealing surface 806 can be offset relative to the axis of the rotating means 804. I.e., the engagement between the seal 808 and the sealing surface 806 can be entirely located downstream of the axis of the rotating means 804 in the upstream shutoff valve 108a of FIG. 1 and can be entirely located upstream of the axis of the rotting means 804 in the downstream shutoff valve 108b of FIG. 1. For example, the obstruction 802 can be mounted on the side of the rotating means 804.

Offsetting the engagement between the seal 808 and the sealing surface 806 relative to the rotating means 804 can allow the backflow prevention device to have an overall shorter laylength. In particular, the sealing point of the obstruction 802 with the housing can be closer to the upstream check valve module, which can, in turn, allow additional space between the inlet of the backflow preventer and the sealing point of the obstruction of the upstream shutoff valve 108*a* for the industry required sensing port. This additional space allows for a shorter laylength of the backflow preventer thus reducing installation and manufacturing costs. Specifically, the sensing port can be parallel to the rotating means 804 rather that upstream or downstream of the rotating means 804.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A backflow prevention device, the backflow prevention device comprising:
   a housing defining a water flow stream;
   an upstream shutoff valve, wherein the upstream shutoff valve is configured to allow a user to control the water flow stream through the housing;
   a check valve module:
      located within the housing downstream of the upstream shutoff valve; and
      including:
   an orifice, wherein the orifice is configured to allow the water flow stream through the check valve module;
   a clapper, wherein the clapper is configured to:
      allow the water flow stream through the orifice when open; and
      prevent the water flow stream through the orifice when in a closed position by mating with the orifice;
   a fulcrum apparatus about which the clapper is allowed to rotate;
   a rotational constraint apparatus which directs the rotation of the clapper; and
   a lateral constraint apparatus constrains the fulcrum apparatus to move upstream and downstream relative to the orifice;
   a downstream shutoff valve:
      located downstream of the check valve module; and
      configured to allow a user to control the water flow stream through the housing.

2. The backflow prevention device of claim 1 further comprising a second check valve module including:
   an orifice, wherein the orifice is configured to allow the water flow stream through the second check valve module;
   a clapper, wherein the clapper is configured to:
      allow the water flow stream through the orifice when open; and
      prevent the water flow stream through the orifice when in a closed position by mating with the orifice;
   a fulcrum apparatus about which the clapper is allowed to rotate;
   a rotational constraint apparatus which directs the rotation of the clapper; and
   a lateral constraint apparatus which directs the motion of the fulcrum toward and away from the orifice.

3. The backflow prevention device of claim 2, wherein the second check valve module is located within the housing upstream of the check valve module.

4. The backflow prevention device of claim 2, wherein the second check valve module is located within the housing downstream of the check valve module.

5. The backflow prevention device of claim 2 further comprising:
   a first sensing port configured to provide access through the housing to the volume upstream of the upstream shutoff valve;
   a second sensing port configured to provide access through the housing to the volume between the upstream shutoff valve and the check valve;
   a third sensing port configured to provide access through the housing to the volume between the check valve and the downstream check valve; and
   a fourth sensing port configured to provide access through the housing to the volume between the downstream check valve and the downstream shutoff valve.

6. The backflow prevention device of claim 1 further comprising an elastomer disk in the clapper of the check valve module, the elastomer disk sealing the mating of the clapper with the orifice.

7. The backflow prevention device of claim 6 further comprising a lip located on the outer edge of the orifice of the check valve module configured to sealingly engage the elastomer disk.

8. A backflow prevention device, the backflow prevention device comprising:
   a housing defining a water flow stream;
   an upstream shutoff valve, wherein the upstream shutoff valve is configured to allow a user to control the water flow stream through the housing;
   a check valve module:
      located within the housing downstream of the upstream shutoff valve; and
      including:
         an orifice, wherein the orifice is configured to allow the water flow stream through the check valve module; and
         a clapper, wherein the clapper is configured to:
            allow the water flow stream through the orifice when open; and
            prevent the water flow stream through the orifice when in a closed position by mating with the orifice;
         a fulcrum apparatus about which the clapper is allowed to rotate;
         a rotational constraint apparatus which directs the rotation of the clapper; and
         a lateral constraint apparatus which constrains the fulcrum apparatus to move upstream and downstream relative to the orifice;
         wherein the motion of the clapper from the closed position to the open position is a hybrid motion;
   a downstream shutoff valve:
      located downstream of the check valve module; and
      configured to allow a user to control the water flow stream through the housing.

9. The backflow prevention device of claim 8, wherein the rotational constraint apparatus includes a rotational linkage attached to the clapper of the check valve module, wherein the rotational linkage is attached offset relative to the rotational axis created by the fulcrum apparatus.

10. The backflow prevention device of claim 8, wherein the rotational constraint apparatus is upstream of the mating of the clapper with the orifice in the closed position.

11. The backflow prevention device of claim 8, wherein the lateral constraint apparatus is downstream of the mating of the clapper with the orifice in the closed position.

12. The backflow prevention device of claim 8, wherein the fulcrum apparatus is downstream of the mating of the clapper with the orifice in the closed position.

13. A backflow prevention device, the backflow prevention device comprising:
- a housing defining a water flow stream;
- an upstream shutoff valve, wherein the upstream shutoff valve is configured to allow a user to control the water flow stream through the housing;
- a check valve module:
  - located within the housing downstream of the upstream shutoff valve; and
  - including:
    - a seat configured to mate with a portion of the housing;
    - an orifice, wherein the orifice is configured to allow the water flow stream through the check valve module; and
    - a clapper, wherein the clapper is configured to:
      - allow the water flow stream through the orifice when open; and
      - prevent the water flow stream through the orifice when in a closed position by mating with the orifice;
    - a fulcrum apparatus about which the clapper is allowed to rotate;
    - a rotational constraint apparatus which directs the rotation of the clapper;
    - a lateral constraint apparatus which constrains the fulcrum apparatus to move upstream and downstream relative to the orifice; and
    - a bias configured to hold the clapper in the closed position a predetermined upstream pressure exists;
  - wherein the motion of the clapper from the closed position to the open position is a hybrid motion; and
- a downstream shutoff valve:
  - located downstream of the check valve module; and
  - configured to allow a user to control the water flow stream through the housing.

14. The backflow prevention device of claim 13, wherein the lateral constraint apparatus of the check valve module includes a guide.

15. The backflow prevention device of claim 14, wherein the guide includes a slot extending perpendicularly from the seat of the check valve module, the fulcrum being slidably mounted within the slot.

16. The backflow prevention device of claim 15, wherein the fulcrum apparatus includes a pin at least partially extending through the slot.

17. The backflow prevention device of claim 13, wherein the bias includes a spring.

* * * * *